United States Patent [19]
Meyer

[11] 3,851,589
[45] Dec. 3, 1974

[54] ELECTRONIC DELAY BLASTER

[75] Inventor: Herbert J. Meyer, Houston, Tex.

[73] Assignee: Texaco Inc., New York, N.Y.

[22] Filed: Apr. 25, 1973

[21] Appl. No.: 354,615

[52] U.S. Cl. .............................. 102/70.2 R, 317/80
[51] Int. Cl. ........................ F42c 13/00, F42d 3/06
[58] Field of Search ................ 102/70.2 R; 317/80

[56] References Cited
UNITED STATES PATENTS

| | | | |
|---|---|---|---|
| 3,312,869 | 4/1967 | Werner ............................... | 317/80 |
| 3,453,496 | 7/1969 | Wright et al. .................. | 102/70.2 R |
| 3,571,605 | 3/1971 | Dobson et al. .................. | 102/70.2 R |
| 3,748,955 | 7/1973 | Gatermann et al. ........... | 102/70.2 R |
| 3,752,081 | 8/1973 | McKeown et al. .............. | 102/70.2 R |
| 3,757,697 | 9/1973 | Phinney ........................ | 102/70.2 R |

Primary Examiner—Benjamin A. Borchelt
Assistant Examiner—C. T. Jordan
Attorney, Agent, or Firm—T. H. Whaley; C. G. Ries

[57] ABSTRACT

Solid-state electronic system for use in timing precisely the detonation of a plurality of explosive charges in order to shape a seismic energy pulse produced thereby. It has a firing circuit for each of the blasting caps that are associated with the explosive charges. And, there are time-delay selection circuits controlling all after the first charge in order to preselect the delays for producing a desired effective shape of the total seismic energy shock created. The time delays are accomplished by counting pulses derived from a crystal-controlled oscillator.

5 Claims, 2 Drawing Figures

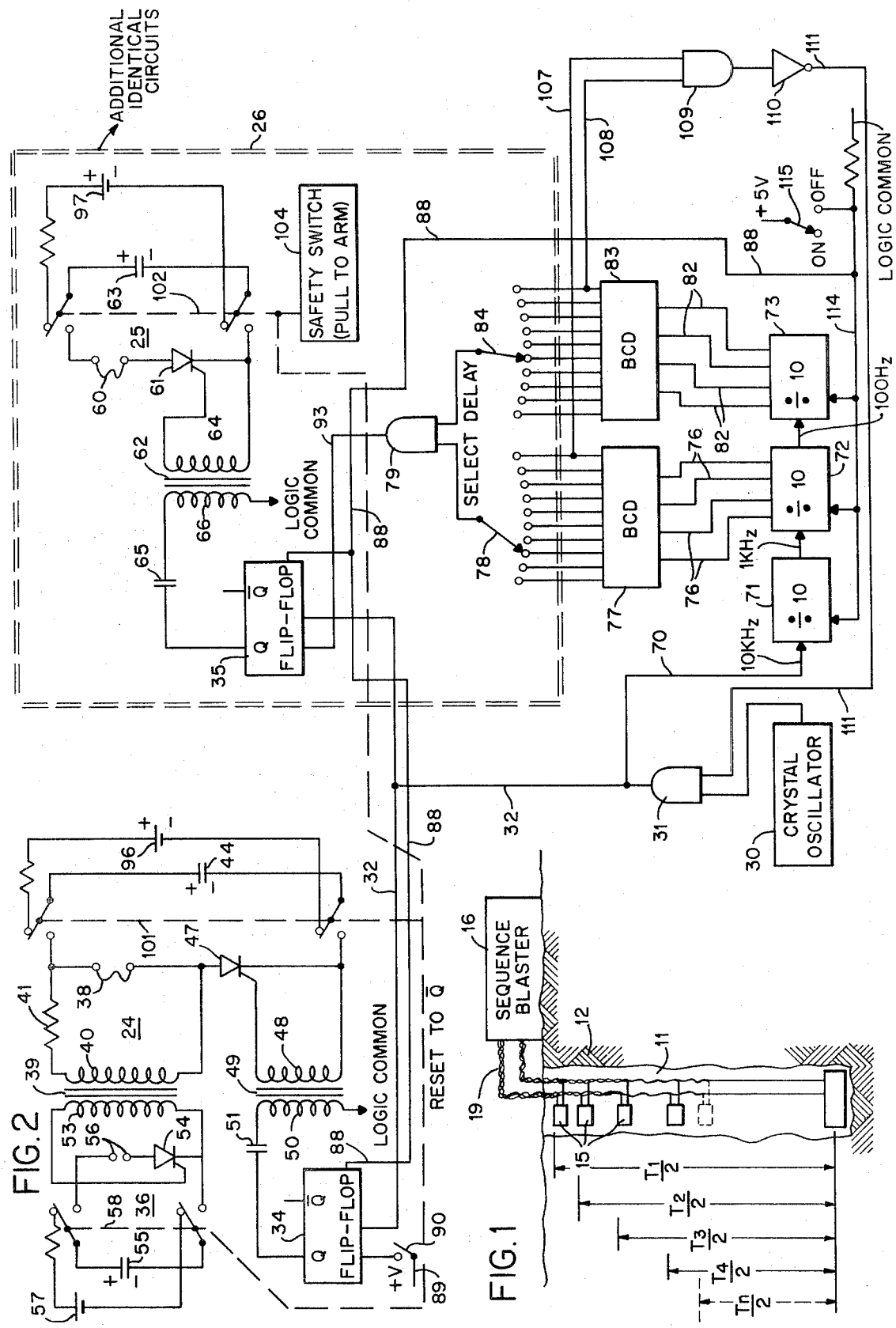

ELECTRONIC DELAY BLASTER

BACKGROUND OF THE INVENTION

1. Field of the Invention

This invention concerns a timing system for sequential shooting. More specifically, it relates to a system for presetting time-delay controls applicable to a plurality of seismic explosive charges.

2. Description of the Prior Art

Heretofore, there has been proposed a method of creating a shaped seismic energy source by determining the delay time between individual charges of a series of such charges in a shot hole. However, that proposal concerned only the method of shaping a seismic charge and was not concerned with how the necessary time delay between firings would be accomplished. In addition, there has been disclosed a control device for time-spaced seismic shots. But, the latter arrangement made use of an electric motor driving rotary switches, in order to create a time base. Such latter arrangement had the obvious drawbacks of bulky size and the requirement for substantial power in operation.

Consequently, it is an object of this invention to provide an electronic system that employs solid-state circuit elements, and can provide a flexible time pattern for seismic charge detonation that may be preset as desired.

SUMMARY OF THE INVENTION

Briefly, the invention concerns an electronic delay blaster for seismic energy shaping. It comprises in combination a plurality of blasting-cap circuits each having a silicon-controlled rectifier for passing current to detonate the cap, and a control circuit for initiating said current flow. The combination also comprises a crystal oscillator for generating a continuous series of clock pulses and an electronic flip-flop unit connected to each of said control circuits for actuating said silicon-controlled rectifiers. It also comprises first circuit means for connecting said clock pulses to an input of each of said flip-flop units for flipping same upon receiving the first clock pulse after each unit has been enabled. Also, it comprises an enabling input circuit for each of said flip-flop units. It also comprises second circuit means for applying an enabling signal to a first one of said flip-flop units for initiating a shaped seismic charge, and means for dividing said clock pulses into predetermined longer time periods between pulses. It also comprises electronic circuit means for providing a selectable series of said divided pulses for selecting a predetermined delay from the beginning to the end of said series. Finally, it also comprises third circuit means associated with each of the remaining ones of said flip-flop units after said first for applying enabling signals in accordance with a predetermined time delay for each.

BRIEF DESCRIPTION OF THE DRAWINGS

The foregoing and other objects and benefits of the invention will be more fully set forth below in connection with the best mode contemplated by the inventor of carrying out the invention, and in connection with which there are illustrations provided in the drawings wherein:

FIG. 1 is a schematic diagram, illustrating the application of a system according to the invention to a seismic shot hole, and FIG. 2 is a block diagram-type circuit, illustrating a system according to the invention.

DESCRIPTION OF THE PREFERRED EMBODIMENT

Referring to FIG. 1, it will be observed that it illustrates schematically a plurality of explosive charges, spaced vertically in a shot hole. These may be arranged with the spacing and the time intervals of detonating them such that some particular shape of the seismic energy pulse will be created, e.g., see the U.S. Patent to H. O. Walker, Jr., U.S. Pat. No. 3,365,020 issued Jan. 23, 1968. Thus, there is illustrated a shot hole 11 in a formation 12. There are vertically spaced in the hole 11 a plurality of explosive charges 15 that are to be detonated by electric blasting caps (not shown). Detonation of these caps is controlled from the surface by a sequence blaster 16 that has cap wires (as indicated by the lines 19) extending from the blaster 16 down to each of the charges 15.

By employing a system according to this invention, the time interval for delay between detonation of the first of charges 15 and the remaining individual charges, may be preset so as to have any desired fraction of a given timing interval. This may be done in order to create a particular shape of the seismic energy created when the charges are detonated.

Referring to FIG. 2, there are illustrated a plurality of blasting-cap circuits, e.g., a first circuit 24 and another circuit 25. As indicated by the caption, there is a portion 26 of the entire circuit (shown enclosed in double-dashed lines) that will be duplicated for a number of additional blasting circuits, depending upon how many caps are to be fired.

There is a crystal-controlled oscillator 30 that acts as the time base for the system. It produces electrical pulses at a predetermined constant rate. In the particular system illustrated, oscillator 30 is designed to oscillate at a frequency of 10 kilohertz.

The output of oscillator 30 is connected via an AND gate 31 to a circuit connection 32 that goes in parallel to the control inputs of a plurality of flip-flop elements 34, 35, and all of the additional corresponding elements (not shown), one for each of the blasting circuits 24, 25, and the additional ones that are not shown. It may be observed that the common circuit 32 has a caption "CLOCK PULSE" applied. This is to indicate that the clock pulses from oscillator 30 are carried by this circuit. It should be noted, however, that the clock pulses are not applied to the circuit 32 unless the AND gate 31 is open.

The blasting circuit 24 controls the first charge to be detonated and, consequently, there is a time-break circuit 36 that is connected across a blasting cap 38 in circuit 24. This circuit 36 is provided in order to develop a time-break signal when the cap 38 is detonated.

Thus, there is a transformer 39 that has a primary winding 40. Winding 40 is connected in series with a resistor 41, and both are connected across the cap 38. When a shooting capacitor 44 discharges through the cap 38, it will cause a surge of current flow that is suddenly interrupted as the thermal element of the cap 38 is broken by the force of the detonation.

Discharge of shooting capacitor 44 is under the control of a silicon-controlled rectifier 47 that is connected with its principal electrodes in series with the cap 38. Rectifier 47 has a control electrode that is connected to one end of a secondary winding 48 of a transformer 49, and there is a primary winding 50 of the transformer 49. This primary winding 50 is connected via a capacitor 51 to the "Q" output of the flip-flop 34.

A time-break signal is created by detonation of the cap 38. The sudden interruption of current flow produces a pulse in a secondary winding 53 of the transformer 39, and this pulse is applied to the control electrode of another silicon-controlled rectifier 54. Connected to the rectifier 54 is a time-break-signal circuit which includes a pair of terminals 56. A recording element (not shown) would be connected to the terminals 56 to record the time-break signal on the record that would be made of the seismic energy created by the multiple charge firing.

The time-break signal is created by discharging of a capacitor 55 that is on stand-by charge from a battery 57. The discharge current flow is triggered by the pulse that is generated in winding 53 of transformer 39 because that winding is connected to the control electrode of the rectifier 54. It will be appreciated that a double-pole double-throw switch 58 would be thrown to the opposite position from that illustrated when the system is armed ready for a charge firing.

As already indicated above, there may be any desired number of blasting caps in addition to the one for the first charge to be detonated, i.e., cap 38. Thus, in the blasting-cap circuit 25, there is a cap 60 while there will be additional blasting caps (not shown), one for each of the additional identical circuits, as indicated by the caption on the circuit portion 26.

It will be observed that the blasting circuit 25 includes a silicon-controlled rectifier 61, which is connected in series with the cap 60 for controlling the instant when current flow will detonate the charge (not shown) associated with the cap 60. As will be indicated more fully below, the current flow will be caused by discharging of a capacitor 63 which is on stand-by charge like capacitor 55.

There is a transformer 62 that has a secondary winding 64 connected to the control electrode of the rectifier 61. Also, the transformer 62 has a primary winding 66 connected via a capacitor 65 to the output of the flip-flop 35. In this manner, the actuation of the firing control for the cap 60 stems from the flip-flop 35.

Timing of a control sequence is carried out by determining the time delay after the first charge firing for each of the additional charges in the sequence. Each time delay may be preset by means of dividing the clock pulses into predetermined longer time periods so that the exact amount of delay, within a given range, may be set. In order to carry this out, there is connected to the common circuit 32, at the output of the AND gate 31, a connection 70 that goes to the input of a divide-by-ten unit 71. The output of unit 71 goes into another divide-by-ten unit 72 which, in turn, has its output fed into a third divide-by-ten unit 73. It will be appreciated by one skilled in the art that these divide-by-ten units may take various specific forms. However, they are preferably made up of solid-state integrated-circuit-type electronic elements that are commercially available.

In the particular system according to this invention, it has been found desirable to employ a crystal oscillator with a frequency of 10 kilohertz so that the input of the unit 72 is at a frequency of 1 kilohertz or 1000 cycles per second, since the divide-by-ten unit 71 produces one cycle at its output for every ten cycles at the input thereof. Similarly, the input to unit 73 is 100 cycles per second, i.e., 100 hertz.

By employing the correct circuit connections internally of the divide-by-ten unit 72, binary-coded outputs are obtained from the various stages in unit 72. Consequently, binary signals representing the input count for every ten cycles from zero through nine are obtained over four circuit connections 76. These connections go from unit 72 into a binary-coded-decimal conversion circuit 77 which is marked "BCD" in the drawing. Circuit 77 provides a unique signal on one of ten output circuits sequentially in order, for every ten input cycles to the unit 72. The ten output circuits may be selectively connected by a selector switch 78 to one input of an AND gate 79.

In a similar manner, there are four circuit connections 82 from the divide-by-ten unit 73. These four connections 82 lead into another binary-coded-decimal circuit 83 which is substantially the same as BCD circuit 77, so that the unique signals in this case represent the successive counts from zero through nine of the 100-hertz input signals being applied to the divide-by-ten unit 73. In this case, there is a selector switch 84 for connecting any one of the ten output circuits from BCD circuit 83 to another input of the AND gate 79.

Again, it will be understood by one skilled in the art that the BCD circuits 77 and 83 may be made up of commercially available integrated circuits. Also, it may be noted that each of the flip-flop units 34 and 35 is preferably a J-K type and may be made up of half of a commercial integrated circuit unit.

All of the flip-flop units including 34, 35, and those in additional circuits like portion 26 are connected with the K inputs in common to a logic common circuit 88, while the J inputs are connected for receiving enabling signals to control the time when clock-pulse inputs will act to flip each unit. Thus, flip-flop 34 has an enabling voltage input at a circuit connection 89 that is applied to the J input via a switch 90, while flip-flop 35 has the J input connected via a circuit connection 93 to the output of the AND gate 79.

Other elements of the system include a plurality of batteries 96 and 97 that are connected across a corresponding plurality of capacitors, i.e., the capacitor 44 for the battery 96, and the capacitor 63 for the battery 97. Also, there is a double-pole double-throw switch 101 and 102 in each case for shifting the connection of the capacitors 44 and 63, respectively, from the charging circuits with the batteries 96 and 97 to the cap-firing circuits 24 and 25. It will be observed that the switches 101 and 102 as well as the similar switch 58 are all actuated in common by a safety switch 104 that will be actuated prior to the detonation of the series of charges.

It should also be noted that there are two circuit connections 107 and 108 that each lead from the last of the decimal circuits from BCD elements 77 and 83. These both go to an AND gate 109 that has its output connected to an inverter 110 which is connected via a circuit connection 111 to the other input of AND gate 31 from that to which oscillator 30 is connected.

It will also be observed that there is a reset circuit 114 that is connected to all of the divide-by-ten units as well as to flip-flop elements via the logic common circuit 88, so that the entire system may be reset following each operation. There is a switch 115 that acts to condition the reset circuits by applying a reset voltage, as indicated.

OPERATION

Operation of the system illustrated in FIG. 2 may be described with reference to the firing of a group of charges. It will be understood that all of the charges which succeed the first will have associated therewith identical circuits like the portion 26 of FIG. 2. In each case the delay time following the initial charge firing will have been determined and preset by the selection switches in the associated circuit.

After the charges with electric blasting caps have been loaded in a shot hole using the usual procedure and when the recording equipment has been set up and made ready, a first step is the actuation of the "safety switch" 104. This throws all of the double-pole double-throw switches 58, 101 and 102 to the opposite position from that illustrated and, therefore, capacitors 55, 44 and 63, respectively, which were charged to the full battery voltages, will be connected across the respective silicon-controlled rectifier units ready for being discharged when each rectifier has its control electrode tripping voltage exceeded.

When a signal to fire the charges is given, the switch 115 will be shifted from the "off" position to the "on" position which is shown is FIG. 2. Also, the switch 90 will be closed. Consequently, all the electronic components which were reset by the application of a positive voltage when the switch 115 was closed (i.e. in the "off" position), will then be activated as a firing cycle is commenced.

The first charge, i.e. cap 38, is detonated immediately as the first clock pulse from the crystal oscillator 30 is passed through the open AND gate 31 to the common circuit 32 and is applied to the flip-flop 34 which is flipped and thus trips the silicon-controlled rectifier 47.

At the same time the divide-by-ten units 71, 72 and 73 are activated and the clock pulses are divided into longer time periods between pulses. In the preferred modification the ten-kilohertz clock pulses are first divided into a one-kilohertz rate at the input of the second divide-by-ten unit 72 and then into a one-hundred-hertz rate at the input of the third unit 73. The binary-coded-decimal circuits 77 and 83 act to pass a series of pulses to the ten circuits of each, which may be selected by the switches 78 and 84, respectively. Thus, the desired preset delay for firing the next charge will have been selected to a given millisecond from 0 to 99.

When the clock pulse which follows the preset delay time is applied to the flip-flop 35 over the circuit connection 32, it will flip that flip-flop and so trip the silicon-controlled rectifier 61 and detonate the cap 60. Of course, the same thing will be true for each of the additional charges in accordance with the preset time delay for each.

It should be understood that the millisecond delay signal which will be transmitted over the selected circuit of the decimal outputs from circuit 77 will appear any number of times without flipping the flip-flop 35, until the selected decade of milliseconds from circuit 83 has been reached. When the latter conditions exist, there will be a coincidence at the AND gate 79, and the flip-flop 35 will be flipped by the next clock pulse received over the circuit connection 32.

After the entire ninety-nine milliseconds have been counted by the BCD circuits 77 and 83, the AND gate 109 will pass a signal that shuts the AND gate 31 so that no more clock pulses will pass. This will prevent a cap which did not fire on time to be fired again.

While a preferred embodiment of the invention has been set forth above in considerable detail in accordance with the applicable statutes, this is not to be taken as in any way limiting the invention but merely as being descriptive thereof.

I claim:

1. Electronic delay blaster for detonating blasting caps for seismic energy shaping, comprising in combination
    a plurality of blasting-cap circuits each having a silicon-controlled-rectifier for passing current to detonate the cap and a control circuit for initiating said current flow,
    a crystal oscillator for generating a continuous series of clock pulses,
    an electronic flip-flop unit connected to each of said control circuits for actuating said silicon-controlled-rectifiers,
    first circuit means for connecting said clock pulses to an input of each of said flip-flop units for flipping same upon receipt of the first clock pulse after each unit has been enabled,
    an enabling input circuit for each of said flip-flop units,
    second circuit means for applying an enabling signal to a first one of said flip-flop units for initiating a shaped seismic charge,
    means for dividing said clock pulses into predetermined longer time periods between pulses,
    electronic circuit means for providing a selectable series of said divided pulses for selecting a predetermined delay from the beginning to the end of said series, and
    third circuit means associated with each of the remaining ones of said flip-flop units after said first for applying enabling signals in accordance with a preselected time delay for each.

2. Electronic delay blaster according to claim 1, wherein
    said dividing means comprises a series of electronic divide-by-ten units, and
    said electronic circuit means comprises a plurality of binary-coded-decimal units, one for each of said divide-by-ten units after the first.

3. Electronic delay blaster according to claim 2, wherein
    said third circuit means comprises an AND gate connected to each of said flip-flop units after the first and a plurality of decimal circuits connected to said binary-coded-decimal units with selector switches for connecting selected ones of said decimal circuits to said AND gate.

4. Electronic delay blaster according to claim 3, wherein
    said first circuit means includes an AND gate between said crystal oscillator and flip-flop-unit inputs, and
    said blaster further comprises means for closing said last-named AND gate at the end of said series of divided pulses.

5. Electronic delay blaster for seismic energy shaping, comprising in combination a plurality of blasting-cap circuits each having a silicon-controlled-rectifier connected in series with terminals for connecting a blasting cap and a control circuit for initiating said current flow through said silicon-controlled-rectifier and cap, a crystal oscillator for generating a continuous series of clock pulses at a frequency of 10 kilohertz, a solid-state electronic J-K-type flip-flop unit connected to each of said control circuits via a transformer and capacitor for actuating said silicon-controlled-rectifiers, first circuit means including an AND gate between said oscillator and a parallel circuit to inputs of said flip-flop units for flipping said units upon receipt of the first clock pulse after each unit has been enabled, a J-input circuit for each of said flip-flop units and said K-inputs being connected to a logic common, second circuit means for applying an enabling signal to the J-input of a first one of said flip-flop units for initiating a shaped seismic charge, a series of three divide-by-ten solid-state electronic units connected to said oscillator on the output side of said AND gate, solid-state electronic circuit means comprising a binary-coded-decimal unit connected to each of said second and third divide-by-ten units for providing ten circuits each for selection of predetermined delays from 0 to 99 milliseconds, third circuit means comprising a selector switch for each of said ten circuits and an AND gate all for each of said flip-flop units after said first for applying enabling signals to the J-inputs thereof, and fourth circuit means including an AND gate connected to the tenth of each of said selection circuits for providing an output to said first circuit AND gate to cut off said clock pulses from said parallel circuit at the end of 99 milliseconds after the initiation of a shaped charge by said second circuit means.

* * * * *